(12) United States Patent
Ziemer

(10) Patent No.: US 7,125,360 B2
(45) Date of Patent: Oct. 24, 2006

(54) MULTI-STAGE TRANSMISSION

(75) Inventor: Peter Ziemer, Tettnang (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 243 days.

(21) Appl. No.: 10/504,630

(22) PCT Filed: Mar. 4, 2003

(86) PCT No.: PCT/EP03/02194

§ 371 (c)(1),
(2), (4) Date: Aug. 13, 2004

(87) PCT Pub. No.: WO03/076828

PCT Pub. Date: Sep. 18, 2003

(65) Prior Publication Data

US 2005/0085332 A1    Apr. 21, 2005

(30) Foreign Application Priority Data

Mar. 8, 2002  (DE) .............................. 102 10 348

(51) Int. Cl.
    *F16H 3/44* (2006.01)
(52) U.S. Cl. ..................... 475/284; 475/288
(58) Field of Classification Search ............ 475/284,
    475/288, 275, 277, 278, 271, 280, 282, 286,
    475/290
    See application file for complete search history.

(56) References Cited

U.S. PATENT DOCUMENTS

| 5,176,592 | A | * | 1/1993 | Nakawaki et al. | ........... 475/278 |
| 6,120,410 | A | * | 9/2000 | Taniguchi et al. | ........... 475/285 |
| 6,135,912 | A | * | 10/2000 | Tsukamoto et al. | ......... 475/271 |
| 6,139,463 | A |   | 10/2000 | Kasuya et al. | |
| 6,558,287 | B1 | * | 5/2003 | Hayabuchi et al. | ......... 475/271 |
| 6,723,018 | B1 | * | 4/2004 | Hayabuchi et al. | ......... 475/276 |
| 6,827,664 | B1 | * | 12/2004 | Stevenson et al. | .......... 475/275 |

FOREIGN PATENT DOCUMENTS

| DE | 199 49 507 A1 | 4/2001 |
| DE | 100 10 243 A1 | 9/2001 |
| EP | 0 434 525 A1 | 6/1991 |
| EP | 0 984 203 A2 | 3/2000 |

(Continued)

*Primary Examiner*—Roger Pang
(74) *Attorney, Agent, or Firm*—Davis & Bujoed, P.L.L.C.

(57) ABSTRACT

A multi-stage transmission comprising two planetary gear sets (RS2, RS3) and one planetary reduction gear set (VS), one first clutch (A) and one second clutch (B), one third clutch (E) and one first brake (C), one second brake (D), the external disc carrier of the clutch (B) being connected with one output element of the planetary reduction gear set (VS), the internal disc carrier of the clutch (B) leads to the internal disc carrier of the brake (C) which is connected with one element of the planetary gear set (RS2), the internal disc carrier of the clutch (A) being connected with one output element of the planetary reduction gear set (VS) and the external disc carrier of the clutch (A) with one element of the planetary gear set (RS3), the external disc carrier of the clutch (E) being connected with one input element of the planetary reduction gear set (VS) and with the drive shaft (AN), the internal disc carrier of the clutch (E) being connected respectively with one element of the planetary gear set (RS2) and of the planetary gear set (RS3), the brake (D) being connected with the planetary gear set (RS2) and the housing being connected with one supporting element of the planetary reduction gear set (VS) and the driven shaft (AB) with the planetary gear set (RS2).

18 Claims, 3 Drawing Sheets

FOREIGN PATENT DOCUMENTS

| | | |
|---|---|---|
| EP | 0 984 204 A2 | 3/2000 |
| EP | 1 013 968 A2 | 6/2000 |
| EP | 1 030 077 A2 | 8/2000 |
| JP | 2000046129 A | 2/2000 |
| JP | 2000110900 A | 4/2000 |
| JP | 2001182785 | 7/2001 |

* cited by examiner

| Gear | Clutch | | | Brake | | Ratios i | Ratio Steps φ |
|---|---|---|---|---|---|---|---|
| | A | B | E | C | D | | |
| 1 | ● | | | | ● | 4.171 | |
| | | | | | | | 1.78 |
| 2 | ● | | | ● | | 2.340 | |
| | | | | | | | 1.54 |
| 3 | ● | ● | | | | 1.521 | |
| | | | | | | | 1.33 |
| 4 | ● | | ● | | | 1.143 | |
| | | | | | | | 1.32 |
| 5 | | ● | ● | | | 0.867 | |
| | | | | | | | 1.25 |
| 6 | | | ● | ● | | 0.691 | |
| R | | ● | | | ● | −3.403 | Total 6.04 |

Fig. 3

MULTI-STAGE TRANSMISSION

This application is a national stage completion of PCT/EP03/02194 filed Mar. 4, 2003 which claims priority from German Application Serial No. 102 10 348.8 filed Mar. 8, 2002.

FIELD OF THE INVENTION

The invention relates to a multi-stage transmission in planetary design, particularly an automatic transmission for a motor vehicle.

BACKGROUND OF THE INVENTION

In the automatic transmission prior art, particularly for motor vehicles, transmissions comprise planetary gear sets which are shifted by means of friction or shifting elements, such as clutches and brakes, and are usually connected with a starting element, such as a hydrodynamic torque converter or a fluid clutch, subject to a slip effect and optionally provided with a lock-up clutch.

Such a transmission results from EP 0 434 525 A1. It essentially comprises one drive shaft and one driven shaft disposed parallel with each other, one double planetary gear set disposed concentrically to the driven shaft and five shifting elements in the form of three clutches and two brakes, the optional locking of which by pairs determines the different gear ratios between the drive shaft and the driven shaft. This transmission has one planetary reduction gear set and two power paths so that by selective engagement by pairs of the five shifting elements six forward gears are obtained.

In the first power path are needed two clutches for transmitting the torque from the planetary reduction gear set to two elements of the double planetary gear set. These are disposed, axially observed, essentially behind the reduction gear set in direction of the double planetary gear set. In the second power path is provided one other clutch which loosely connects it with one other element of the double planetary gear set. The clutches are arranged here in a manner such that the internal disc carrier constitutes the output.

From the published U.S. Pat. No. 6,139,463 is further known a multi-stage transmission in planetary design, specially for a motor vehicle, which has two planetary gear sets and one planetary reduction gear set, the same as three clutches and two brakes. In this already known multi-stage transmission, two clutches C-1 and C-3 are provided in the first power path for transmitting the torque from the planetary reduction gear set to the two planetary gear sets. The external disc carrier or the cylinder or piston and pressure compensation side of the clutch C-3 is connected with a first brake B-1. Besides, the internal disc carrier of the third clutch C-3 is connected with the cylinder or piston and pressure compensation side of the first clutch C-1, the internal disc carrier of the first clutch C-1 being situated on the output side and connected with a sun gear of the third planetary gear set.

The known multi-stage transmission has the disadvantage that, particularly in the sixth gear, the first brake B-1 is closed. Thereby stands the cylinder of the third clutch C-3 so that no hydrodynamic pressure can build up. In this manner, the pressure compensation space of the third clutch can run idle whereby the shifting quality of the known multi-stage transmission is impaired.

From the published U.S. Pat. No. 6,135,912 is further known a similar multi-stage transmission. In this multi-stage transmission which, likewise, has two clutches C-1 and C-3 for transmitting the torque from the planetary reduction gear set to the planetary gear sets, the internal disc carriers of these clutches are preferably connected with the planetary gear sets. One other embodiment disclosed within the scope of the cited publication provides that the external disc carrier of the clutch C-3 is situated on the output side. This construction, specially the arrangement of the clutches relative to the output or input, has also been disclosed within the scope of U.S. Pat. No. 6,120,410 which also describes a multi-stage transmission of the type mentioned.

The problem on which this invention is based is to propose a multi-stage transmission of the above mentioned type in which the shifting quality is improved. A clutch system is to be specially indicated which, in compact design, makes it possible to implement a quick and comfortable shifting behavior.

SUMMARY OF THE INVENTION

An inventive multi-stage transmission in planetary design with two power paths is accordingly proposed in which a first and a second clutch are provided for transmitting the torque of the planetary reduction gear set to the two planetary gear sets of a main gear set via a first power path. The second clutch is here connectable on the output side with one brake whereas the output side of the first clutch is connected with one element of the main gear set.

Contrary to the prior art, the external disc carrier of the second clutch connectable on the output side with a first brake is tied to a rotating output element of the planetary reduction gear set thus preventing an idling operation of a preferably existing pressure compensation space. The internal disc carrier of this second clutch preferably leads, when radially observed, above the first clutch to the internal disc carrier of the first brake which is connected via one shift with one element of the second planetary gear set. The internal disc carrier of the first clutch is inventively tied directly to the output or to the output element of the planetary reduction gear set, the external disc carrier or the cylinder/piston side of the first clutch being connected via one shaft with one element of the third planetary gear set.

It is further provided in the inventive multi-stage transmission that the external disc carrier of a third clutch provided for the second power path is connected with an input element of the planetary reduction gear set and with the drive shaft, the internal disc carrier of the third clutch being connected, respectively, with one element of the second planetary gear set and of the third planetary gear set. One second brake is also connected with an element of the second planetary gear set. In addition, the housing is connected with one supporting element of the planetary reduction gear set and the driven shaft is connected with one element of the second planetary gear set.

In this manner the positions, particularly of the first clutch and of the second clutch, are changed compared to the prior art. Thereby are prevented disadvantages known from the prior art, specially from U.S. Pat. No. 6,139,463, so that in the inventive multi-stage transmission the shifting quality is advantageously improved.

According to a development of this invention, the ring gear can be provided as input element of the planetary reduction gear set. It is also conceivable that in the inventive multi-stage transmission, the spider or any other central gear is used as planetary reduction gear set.

Within the scope of another development of the invention, the spider can be provided as an output element of the planetary reduction gear set. It is also conceivable here that a central gear is provided, as needed, in the inventive multi-stage transmission.

It is also possible that in the inventive multi-stage transmission, the sun gear is provided as supporting element of the planetary reduction gear set. But it is also possible that the spider or any other central gear ise used as a supporting element.

It is especially advantageous if the second planetary gear set and the third planetary gear set are designed as so-called Ravigneaux gear sets.

Within the scope of one embodiment of the invention it is proposed to situate the planetary reduction gear set, radially observed, essentially beneath the second clutch whereby a specially compact construction is implemented. In this connection, the third clutch can be located, radially observed, essentially beneath the first clutch.

In the inventive multi-stage transmission, six forward gears and one reverse gear are preferably implemented.

BRIEF DESCRIPTION OF THE DRAWINGS

The invention will now be described, by way of example, with reference to the accompanying drawings in which:

FIG. 3 is a circuit diagram of the inventive multi-stage transmission according to FIGS. 1 and 2.

DETAILED DESCRIPTION OF THE INVENTION

Figure 1:
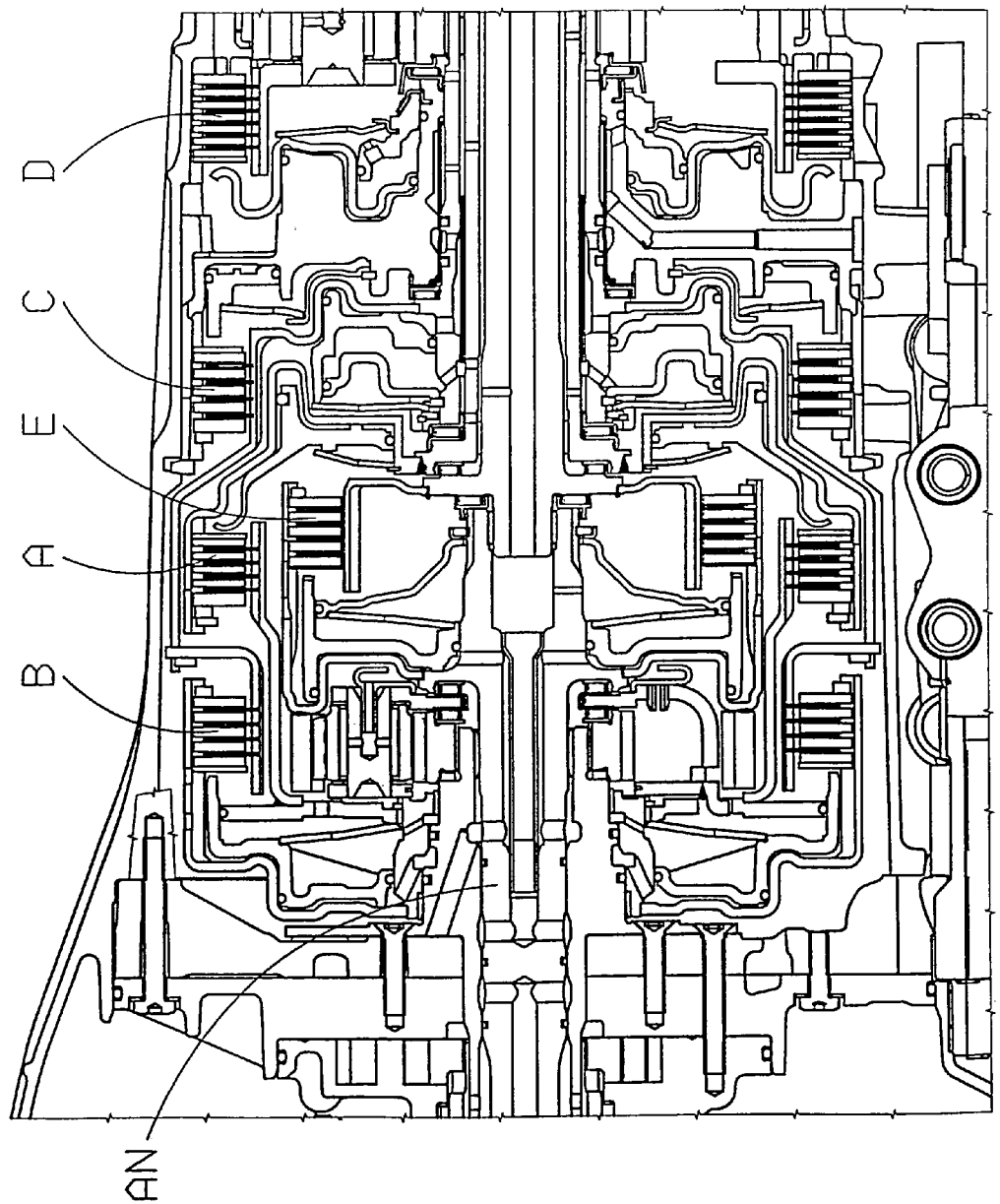
FIG. 1 is a cut partial view of an inventive multi-stage transmission.
Figure 2:
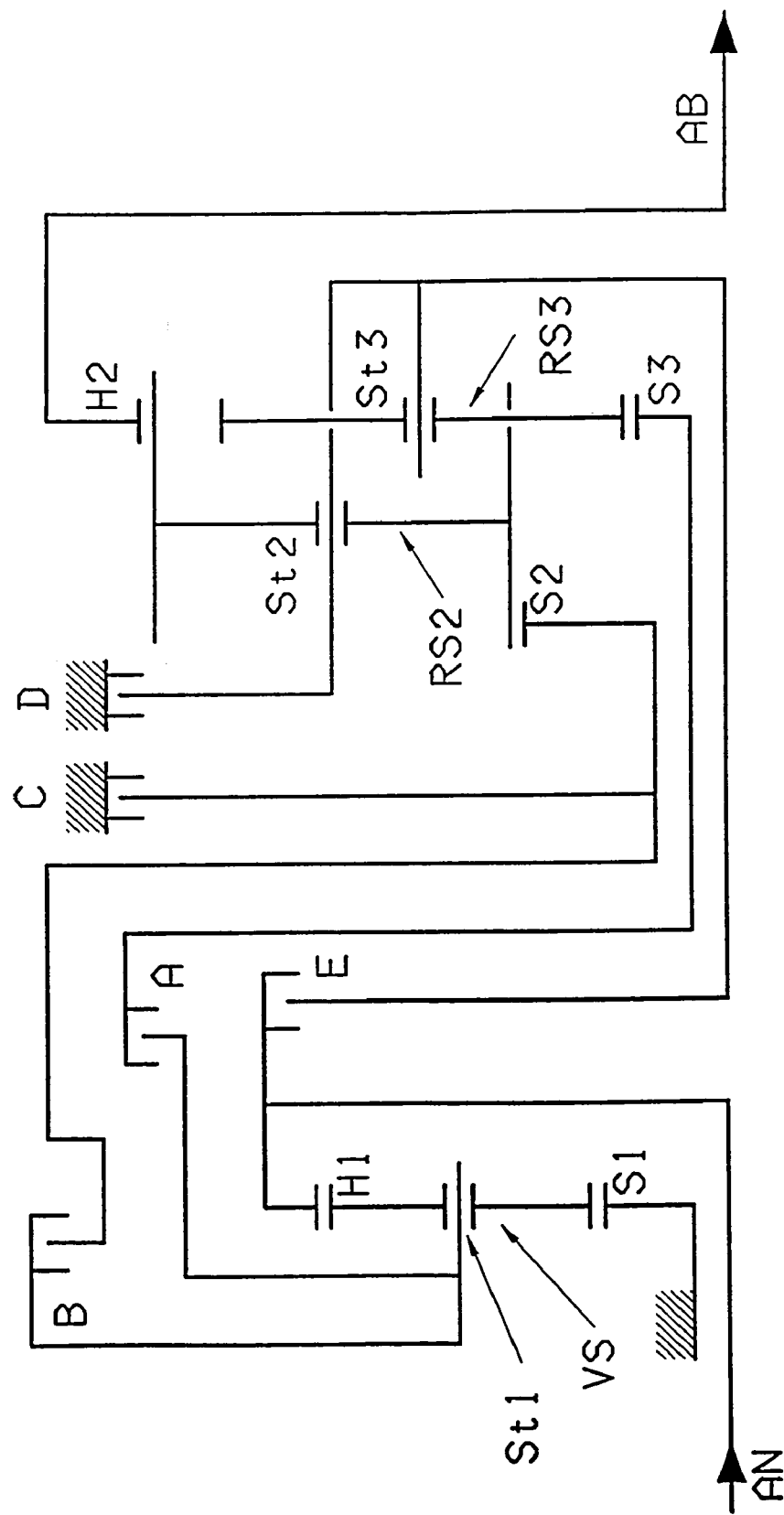
FIG. 2 is a principle shift pattern of the inventive multi-stage transmission.

In FIGS. 1 and 2 is shown an inventive multi-stage transmission in planetary design, particularly an automatic transmission for a motor vehicle. The inventive multi-stage transmission comprises at least one drive shaft AN and one driven shaft AB located in one housing. In addition, one first gear set, one planetary reduction gear set VS and one main gear set with one second and one third planetary gear set RS2, RS3 are provided. The second planetary gear set RS2 and the third planetary gear set RS3, in the development shown of the inventive multi-stage transmission, are designed as Ravigneaux gear sets.

In the multi-stage transmission are further provided five shifting elements, namely, one first clutch A, one second clutch B and one third clutch E and one first brake C and one second brake D, the clutches A and B transmitting the torque of the planetary reduction gear set to the planetary gear sets RS2, RS3 of the main gear set. By means of a selective engagement by pairs, the shifting elements produce different reduction ratios between the drive shaft AN and the driven shaft AB so that six forward gears and one reverse gear can preferably be implemented.

It is inventively provided in the multi-stage transmission that the external disc carrier or the cylinder, piston and pressure compensation side of the clutch B is connected with a spider St1 of the planetary reduction gear set VS. At least the clutch B preferably has one servo device with one dynamic pressure compensation. The inventive idea prevents an idling of the pressure compensation spaces thus improving the comfort and shifting quality. The internal disc carrier of the clutch B, preferably radially observed, leads here above the clutch A to the internal disc carrier of the brake C which is fastened on the housing. The internal disc carrier of the brake C is connected via one shaft with a sun gear S2 of the second planetary gear set RS2 designed as a Ravigneaux gear set. The internal disc carrier of the clutch A is situated on the input side and directly tied to the spider St1 of the planetary reduction gear set, the external disc carrier or the cylinder or piston and pressure compensation side of the clutch A being connected via one shaft with a sun gear S3 of the third planetary gear set RS3 designed as a Ravigneaux gear set.

The external disc carrier or the cylinder or piston and pressure compensation side of the clutch E is connected with a ring gear H1 of the planetary reduction gear set VS and with the drive shaft AN. The internal disc carrier of the clutch E is connected respectively with a spider St2 of the second planetary gear set RS2 and with a spider St3 of the third planetary gear set RS3. Besides, the brake D, which is connected with the housing, is tied by its internal disc carrier to the spider St2 of the second planetary gear set RS2. A sun gear S1 is connected with the housing as supporting element of the planetary reduction gear set VS. In addition, a ring gear H2 is connected with the driven shaft AB.

In the inventive multi-stage transmission, the shifting quality can be advantageously improved by the arrangement of the input of the clutch A as internal disc carrier and of the input of the clutch B as an external disc carrier. Besides, in this development of the instant invention, the transmission input rotational speed detection can be left on the former place.

In FIGS. 1 and 2, the planetary reduction gear set VS, radially observed, is essentially beneath the second clutch B and the third clutch E essentially beneath the first clutch A whereby a specially compact design is obtained.

The corresponding wiring diagram of the embodiment of the inventive multi-stage transmission is shown in FIG. 3, there being indicated by way of example ratios i and a resulting ratio steps φ.

Accordingly, the inventive multi-stage transmission has a progressive gradation. Besides, double shifts are prevented in sequential shifting mode, since each of the adjacent gear steps uses one shifting element in common. IN addition, only one shifting element is actuated in any gear shift between the first and the fourth gears and between the fifth and the sixth gears.

For the gears 1 to 4, the clutch A is permanently activated. Additionally, the brake D is closed or actuated in the first gear; the brake C, in the second gear; the brake B, in the third gear; and the clutch E, in the fourth gear. In the gears 5 and 6, together with the permanently actuated clutch E, additionally, the clutch B is activated in the fifth gear and the clutch C, and in the sixth gear. In the reverse gear, the clutch B and the brake D are activated.

| Reference numerals |
| --- |
| A first clutch |
| B second clutch |
| E third clutch |
| C First brake |
| D second brake |
| VS planetary reduction gear set |
| RS2 second planetary gear set |
| RS3 third planetary gear set |
| AN drive shaft |
| AB driven shaft |
| S1 sun gear of the planetary reduction gear set |
| S3 sun gear of the second planetary gear set |

-continued

| Reference numerals |
|---|
| S3 sun gear of the third planetary gear set |
| St1 spider of the planetary reduction gear set |
| St2 spider of the second planetary gear set |
| St3 spider of the third planetary gear set |
| H1 ring gear of the planetary reduction gear set |
| H2 ring gear of the second planetary gear set |
| i ratio φ ratio steps |
| 1 gear |
| 2 gear |
| 3 gear |
| 4 gear |
| 5 gear |
| 6 gear |

The invention claimed is:

1. A multi-stage automatic transmission of a planetary design for a motor vehicle, comprising:
at least one drive shaft (AN) and one driven shaft (AB) located in a housing;
at least two planetary gear sets (RS2, RS3) of a main gear set and one planetary reduction gear set (VS), at least five shifting elements comprising a first clutch (A) and a second clutch (B) which transmit torque of the planetary reduction gear set via a first power path to the planetary gear sets (RS2, RS3) of the main gear set, a third clutch (E) and a first brake (C) and a second brake (D) for selective engagement of pair of the shifting elements to produce different reduction ratios between the drive shaft and the driven shaft,
wherein an external disc carrier of the second clutch (B) is connected with one output element of the planetary reduction gear set (VS), an internal disc carrrier of the second clutch (B) extends radially above the first clutch (A) to the internal chisc carrier of the first brake (C), and the first clutch (A) is axially positioned between the second clutch (B) and the first brake (C), an internal disc carrier of the second clutch (B) extends to an internal disc carrier of the first brake (C) which, via a first shaft, is connected with one element of a second planetary gear set (RS2), an internal disc carrier of the first clutch (A) is connected with one output element of the planetary reduction gear set (VS), an external disc carrier of the first clutch (A) is connected with (VS) element of a third planetary gear set (RS3), an external disc carrier of the third dutch (E) is connected with one input element of the planetary reduction gear set (VS) and with the drive shaft (AN), the internal disc carrier of the third clutch (E) is respectively connected with one element of the second planetary gear set (RS2) and of the third planetary gear set (RS3), the second brake (D) is connected with one element of the second planetary gear set (RS2), the housing is connected with one supporting element of the planetary reduction gear set (VS) and the driven shaft (AB) is connected with one element of the second planetary gear set (RS2).

2. The multi-stage transmission according to claim 1, wherein the planetary reduction gear set (VS), observed radially, is substantially situated beneath the second clutch (B).

3. The multi-stage transmission according to claim 1, wherein that the third clutch (E), observed radially, is substantially situated beneath the first clutch (A).

4. The multi-stage transmission according to claim 1, wherein at least the second clutch (B) has one serve device with a dynamic pressure compensation.

5. The multi-stage transmission according to claim 1, wherein a first ring gear (H1) is provided as an input element of the planetary reduction gear set (VS).

6. The multi-stage transmission according to claim 1, wherein a first spider (St1) is provided as an output element of the planetary reduction gear set (VS).

7. The multi-stage transmission according to claim 1, wherein a first sun gear (S1), which is connected with the housing, is provided as a supporting element of the planetary reduction gear set (VS).

8. The multi-stage transmission according to claim 1, wherein the second planetary gear set (RS2) and the third planetary gear set (RS3) are both designed Ravigneaux gear sets.

9. The multi-stage transmission according to claim 1, wherein the multi-stage transmission can implement six forward gears and one reverse gear.

10. A multi-stage automatic transmission for a motor vehicle, comprising:
at least one drive shaft (AN) and one driven shaft (AB) located in a housing;
one planetary gear set (VS);
at least a first planetary gear set (RS2) and a second planetary gear set (RS3) of a main gear set;
at least five shifting elements comprising;
a first clutch (A) and a second clutch (B) which transmit torque of the planetary reduction gear set via a first power path to the first planetary gear set (RS2) and the second planetary gear set (RS3) of the main gear set;
a third clutch (E), a first brake (C) and a second brake (D) for selective engagement of pairs of the shifting elements to produce different reduction ratios between the drive shaft and the driven shaft; and
wherein an external disc carrier of the second clutch (B) is connected with one output element of the planetary reduction gear set (VS), an internal disc carrier of the second clutch (B) extends radially beyond the first clutch (A) to an internal disc carrier of the first brake (C) which, via a first shaft, is connected with one element of the second planetary gear set (RS2), and the first clutch (A) is positioned axially in the transmission between the second clutch (B) and the first brake, and an internal disc carrier of the first clutch (A) is connected with one output element of the planetary reduction gear set (VS), external disc carrier of the first clutch (A) is connected with one element of the third planetary gear set (RS3), an external disc carrier of the third clutch (E) is connected with one input element of the planetary reduction gear set (VS) and with the drive shaft (AN), the internal disc carrier of the third clutch (E) is respectively connected with one element of the second planetary gear set (RS2) and of the third planetary gear set (RS3), the second brake (D) is connected with one element of the second planetary gear set (RS2), the housing is connected with one supporting element of the planetary reduction gear set (VS) and the driven shaft (AB) is connected with one element of the second planetary gear set (RS2).

11. The multi-stage transmission according to claim 10, wherein the planetary reduction gear set (VS), observed radially, is substantially situated beneath the second clutch (B).

12. The multi-stage transmission according to claim 10, wherein that the third clutch (E), observed radially, is substantially situated beneath the first dutch (A).

13. The multi-stage transmission according to claim 10, wherein at least the second clutch (B) has one servo device with a dynamic pressure compensation.

14. The multi-stage transmission according to claim 10, wherein a first ring gear (H1) is provided as an input element of the planetary reduction gear set (VS).

15. The multi-stage transmission according to claim 10, wherein a first spider (St1) is provided as an output element of the planetary reduction gear set (VS).

16. The multi-stage transmission according to claim 10, wherein a first sun gear (S1), which is connected with the housing, is provided as a supporting element of the planetary reduction gear set (VS).

17. The multi-stage transmission according to claim 10, wherein the second planetary gear set (RS2) and the third planetary gear set (RS3) are both designed as Ravigneaux gear sets.

18. The multi-stage transmission according to claim 10, wherein the multi-stage transmission can implement six forward gears and one reverse gear.

* * * * *